United States Patent [19]
Saitou et al.

[11] Patent Number: 5,604,818
[45] Date of Patent: Feb. 18, 1997

[54] APPARATUS FOR MEASURING SIGHTING DIRECTION

[75] Inventors: Hiroshi Saitou; Masao Sakata; Shigeru Okabayashi, all of Yokohama, Japan

[73] Assignee: Nissan Motor Co., Ltd., Kanagawa-ken, Japan

[21] Appl. No.: 208,324

[22] Filed: Mar. 10, 1994

[30] Foreign Application Priority Data

Mar. 11, 1993 [JP] Japan .................................. 5-050619

[51] Int. Cl.⁶ .................................................. G06T 7/00
[52] U.S. Cl. ............................ 382/128; 348/78; 351/210
[58] Field of Search ........................... 382/1, 6, 48, 117, 382/128; 351/209, 210; 340/825.19; 345/156, 158; 348/78; 354/410

[56] References Cited

U.S. PATENT DOCUMENTS

| | | | |
|---|---|---|---|
| 4,973,149 | 11/1990 | Hutchinson | 351/210 |
| 5,016,282 | 5/1991 | Tomono et al. | 382/1 |
| 5,220,361 | 6/1993 | Lehmer et al. | 351/210 |
| 5,231,674 | 7/1993 | Cleveland et al. | 351/210 |
| 5,386,258 | 1/1995 | Nagano | 351/210 |
| 5,471,542 | 11/1995 | Ragland | 382/128 |

FOREIGN PATENT DOCUMENTS 2-134130  5/1990  Japan .

*Primary Examiner*—Leo Boudreau
*Assistant Examiner*—Jon Chang
*Attorney, Agent, or Firm*—Lowe, Price, LeBlanc & Becker

[57] ABSTRACT

An apparatus for measuring a sighting direction of human eyes includes: a camera oriented toward an eye and picking up images thereof with invisible light, a first light source coaxially installed with the camera and emitting the invisible light toward the human eye, a second light source installed apart from said first light source and emitting invisible light toward the human eye, a calculator for calculating an expression of a line via the center of the pupil, an expression of a line via the position of the reflection of the first light source, and an expression of a line via the position of the reflection of the second light source, according to the images of the eye, calculating the position of the center of the corneal sphere according to the expressions of the lines via the positions of the reflections of the first and second light sources, and calculating the sighting direction of the eye according to an expression of a line via the center of the pupil obtained and the center of the corneal sphere of the eye.

8 Claims, 11 Drawing Sheets

RESULT OF PROCESSING FOR I1 (x,y)

RESULT OF PROCESSING FOR I2 (x,y)

( ENLARGEMENT DRAWING OF DISPLAY ITEMS IN SWITCH AREA 6 IN DIRECTION OF SIGHT )

(ENLARGEMENT DRAWING OF STEALING IN SWITCH 4)

APPARATUS FOR MEASURING SIGHTING DIRECTION

BACKGROUND OF THE INVENTION

1. Field of the Invention

The present invention relates to an apparatus for measuring a sighting direction of eyes, for example a driver's eyes, in a noncontact manner.

2. Description of the Prior Art

An example of a conventional apparatus for measuring a sighting direction of eyes is disclosed in Japanese Laid-Open Patent Publication No. 2-134130. This conventional apparatus employs two cameras spaced apart from each other. One of the cameras is coaxial with a light source. Each camera picks up an image of the corneal sphere of an eye of an objective person. On each of the picked up images, the coordinates of the reflection of the light source are connected to the coordinates of the camera, to find an expression representing a straight line passing through the center of the corneal sphere. At the same time, the coordinates of the center of the pupil of the eye are found. An intersection of the straight lines obtained with the two cameras determines the coordinates of the center of the corneal sphere, and a straight line connecting the center of the corneal sphere to the center of the pupil determines the sighting direction of the eye. This apparatus employs two cameras, and therefore, is expensive. This is a problem.

SUMMARY OF THE INVENTION

An object of the present invention is to provide, with due consideration to the drawbacks of such conventional apparatus devices, a semiconductor memory device provided with an inexpensive apparatus employing only one camera for measuring a sighting direction of eyes.

An apparatus for measuring a sighting direction of human eyes, as a preferred embodiment of the present invention, comprises:

a camera oriented toward one of the human eye and picking up images of the human eye with invisible light;

a first light source coaxially installed with said camera and emitting the invisible light toward the human eye;

a second light source installed apart from said first light source and emitting invisible light toward the human eye;

first arithmetic operation means for calculating an expression representing a straight line passing through the center of the pupil of the human eye, an expression representing a straight line passing through the position of the reflection of said first light source, and an expression representing a straight line passing through the position of the reflection of said second light source, according to the images of the eye picked up by said camera;

second arithmetic operation means for calculating the position of the center of the corneal sphere of the human eye according to the expressions representing the straight lines passing through the positions of the reflections of said first and second light sources calculated by the first arithmetic operation means; and third arithmetic operation means for calculating the sighting direction of the human eye according to an expression representing a straight line passing through the center of the pupil obtained by the first arithmetic operation means and the center of the corneal sphere of the human eye obtained by the second arithmetic operation means.

In the apparatus described above, said first and second light sources emit far infrared rays.

Further in the apparatus above, said first light source and the camera are installed on a coaxial system, and the first light source and the second light source are not installed on a coaxial system.

Moreover, in the apparatus above, said first, second, third arithmetic operation means are made up of a microcomputer.

A method for measuring sighting direction of a human eye according to the present invention, comprises steps of:

transmitting a measurement start indication signal from a main controller;

turning on a first light source;

picking up immediately first image data of the human eye generated in a camera;

converting the first image data into digital image data by a A/D converter;

turning off the first light source;

turning on a second light source;

picking up immediately a second image data of the human eye generated in the camera;

converting the second image data into second digital image data by the A/D converter;

turning off the second light source;

extracting corneal reflex images and a retinal reflex image out of the first digital image data and the second digital image data by a characteristics extract section; and calculating barycenters of the corneal reflex image and the retinal reflex image; and determining a sighting direction of the human eye based on a center O of a corneal sphere and a center Q of a pupil of the human eye, calculated by using the barycenters of the corneal reflex image and the retinal reflex image.

These and other objects, features and advantages of the present invention will be more apparent from the following description of preferred embodiments, taken in conjunction with the accompanying drawings.

DETAILED DESCRIPTION OF THE EMBODIMENTS

General Outline of the Present Invention

An apparatus for measuring a sighting direction of eyes according to the present invention employs a camera for photographing a human eye, a first light source for emitting invisible light, and a second light source for emitting invisible light. The camera and first light source are coaxial with each other. The second light source is located at a different position from the first light source, and thus is not coaxial with the camera. Images photographed by the camera are used to find a first expression representing a straight line (Line F1A) passed between the center (Q) of the pupil of the eye and the focus point (F1) of the camera, a second expression representing a straight line (Line F1B) passed between the position (P') of the reflection of the first light source and the focus point (F1) of the camera, and a third expression representing a straight line (Line F1C) passed between the position (P) of the reflection of the second light source and the focus point (F1) of the camera. According to the expressions representing the straight lines (Lines F1B and F1C) passing through the reflections, the position of the center of the corneal sphere of the eye is calculated. According to the positions of the centers of the pupil and corneal sphere, the sighting direction of the eye of a human (for example a driver of an automobile) is calculated.

Embodiments of the present invention will now be explained with reference to the drawings.

Figure 1:
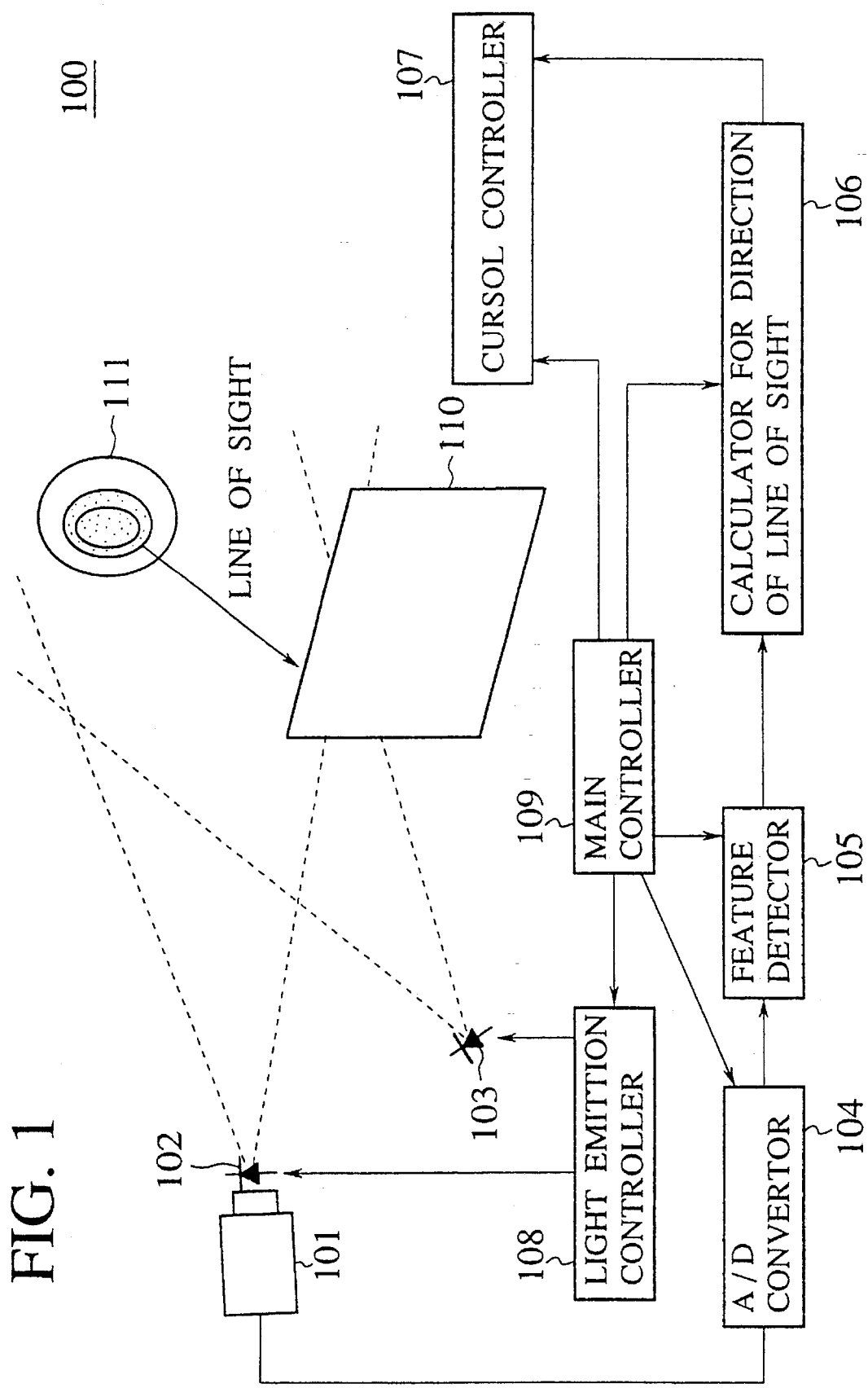
FIG. 1 is a block diagram showing an apparatus for measuring a sighting direction of eyes according to an embodiment of the present invention.

FIG. 1 is a block diagram showing an apparatus 100 for measuring a sighting direction of an eye 111 according to a first embodiment of the present invention. The apparatus 100 detects the sighting direction of the eye and controls the position of a cursor on a display of a computer system accordingly.

Components of the apparatus 100 will now be explained. A camera 101 photographs the eye 111. A first light source 102 is made of LEDs, etc., and positioned in front of a lens of the camera 101 so that the first light source 102 emits light along an optical axis of the camera 101. A second light source 103 is made up of LEDs, etc. The position of the second light source 103 relative to the position of the first light source 102 is known. An A/D converter 104 converts image data transmitted from the camera 101 into digital data. A characteristics extract section 105 receives the digital image data from the A/D converter 104 and extracts an image reflected by the cornea of the eye 111 as well as the center of the pupil of the eye 111. A sighting direction calculation section 106 calculates the sighting direction of the eye 111 according to the reflection image and pupil center. A cursor controller 107 displays a cursor on the computer screen 110 according to the calculated sighting direction. A light emission controller 108 controls the first and second light sources 102 and 103. A general or main controller 109 controls the apparatus 100 as a whole. The computer screen 110 is observed by a person whose sighting direction is measuredly the apparatus 100. Specifically, light from the first and second light sources 102 and 103 is invisible. The camera 101 detects near infrared rays emitted by the light sources 102, 103.

The principle of detecting a sighting direction of eyes according to the apparatus 100 will be explained with reference to FIGS. 2 and 3.

Figure 2:
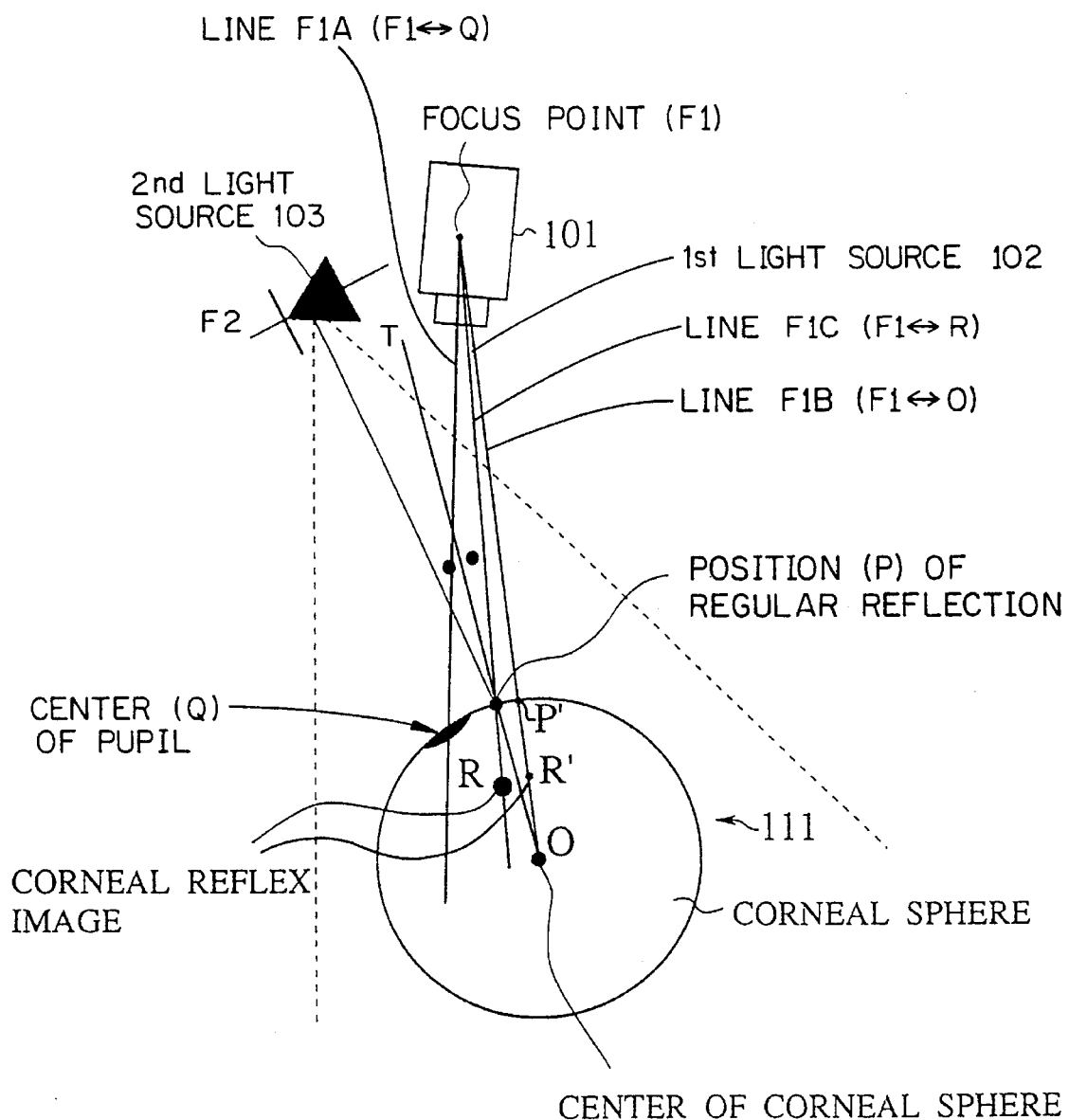
FIG. 2 is an explanation diagram for showing generation of a corneal reflex image of an eye when its corneal sphere (human eye ball) is lighted by an external light source.

FIG. 2 shows a state wherein the corneal sphere 111 is irradiated with light from the light sources 102 and 103. The light from each of the light sources is regularly reflected by the surface of the cornea of the eye 111 and is picked up as a light spot by the camera 101. This light spot is called a corneal reflection image. The light is regularly reflected at a point P on a corneal sphere having a center O, to form a virtual corneal reflection image at a point R. When the camera 101 and light sources 102 and 103 form a coaxial system, the points P and R are on a single straight line.

When a sensor of the coaxial system in the apparatus 100 observes the corneal sphere 111, the center O of the corneal sphere 111 is on a straight line that connects the point R' of the corneal reflection image in the camera 101 to the point P' of the light source (the focus point of the camera 101). In addition, in FIG. 2, the regular reflection point P is on the straight line that connects the point R of the corneal reflection image to the focus point of the camera 101.

In addition, beam of light from the light source passes the pupil of the eye, is reflected by the retina of the eye, and returns in an incident direction through the retina of the eye to the camera. As a result, an area of the pupil becomes brighter in the camera. This is commonly called a red-eye phenomenon that occurs when one's face is photographed with a strobe and causes photographed eyes to shine in red. This image due to the retina reflection is called a retina reflex image.

Figure 3:
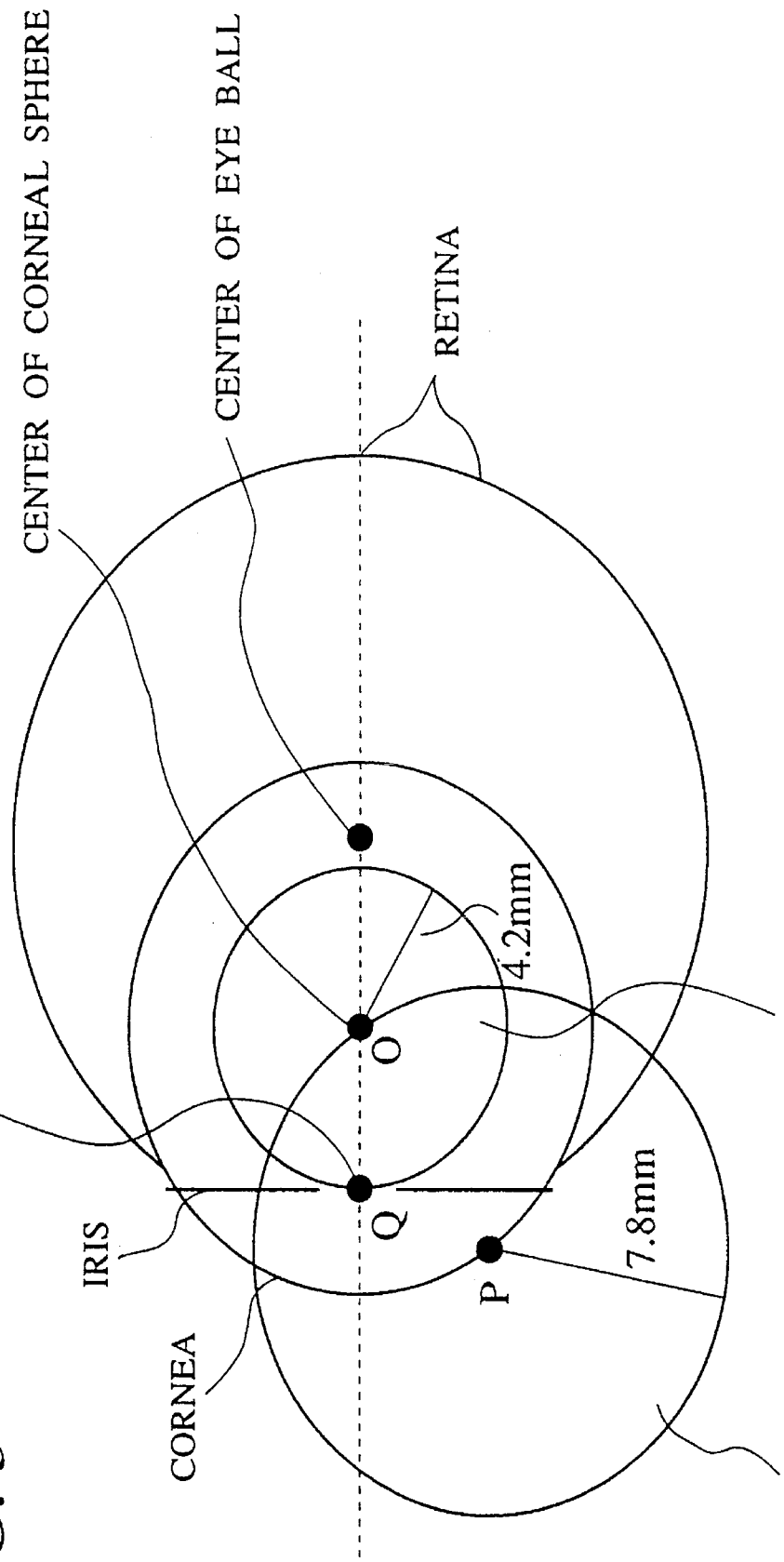
FIG. 3 is a model of a human eye ball.

FIG. 3 shows a model of a human eye ball in configuration.

The retina reflex image is generally observed as an ellipse. The barycenter of the ellipse agrees with a center Q of a pupil of an eye. Specifically, the center Q of a pupil exists on a straight line that connects the barycenter of the retina reflex image in the camera to the focal point of the camera.

According to these data prescribed above, the apparatus 100 for measuring sighting direction of the present invention finds the three-dimensional positions of the center O of the corneal sphere and the center Q of the pupil and calculates the sighting direction of the eye by connecting the center O of the corneal sphere to the center Q of the pupil.

The operation of the apparatus 100 shown in FIG. 1 will now be explained with reference to a flowchart of FIG. 4.

In the step 410, the main controller 109 sends a measurement start indication signal. In the step 420, the light emission controller 108 sends a trigger signal to turn on the first light source 102. In step the 430, the camera 101 picks up an image. This image is converted by the A/D converter 104 in order to generate a digital image data I1(x, y). In the step 440, the first light source 102 is turned off.

In the step 450, the light emission controller 108 sends a trigger signal to turn on the second light source 103. At the same time the camera 101 picks up an image in the step 460. The image is converted by the A/D converter 104 in order to generate digital image data I2(x, y). In the step 470, the second light source 103 is turned off. These two image data I1(x, y) and I2(x, y) are picked up at approximately the same time in the steps 430 and 460. In other words, a pair of the images are obtained at the same time.

In the steps 480 and 490, the characteristics extract section 105 extracts corneal reflex images and a retinal reflex image out of the two items of image data I1(x, y) and I2(x, y), and calculates the barycenters of the reflection images. In the steps 500 to 520, a center O of a corneal sphere center O and a center Q of a pupil of the human eye are determined, and according to the centers O and Q, a sighting direction is determined.

The extraction of the corneal and retinal reflection images, the determination of the center O of the corneal sphere and the center Q of the pupil, and the determination of the sighting direction will be explained in detail with reference to FIGS. 5 to 8.

Figure 5:
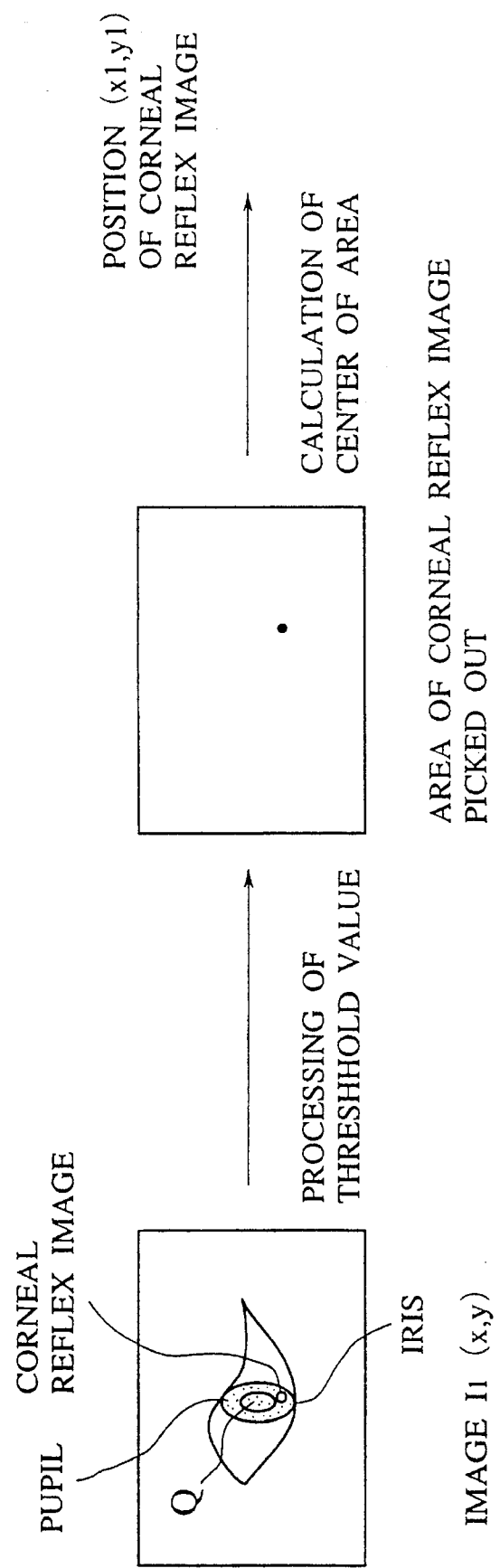
FIG. 5 shows a process of extracting a corneal reflex image.

FIG. 5 shows a process of extracting a corneal reflex image out of the image data I1(x, y). The corneal reflex image is usually observed as a very bright spot, and therefore, the corneal reflex image may be easily extracted from each of binary images which are obtained from the two items of image data I1(x, y) and I2(x, y) based on a binarization process by using a threshold value Th1. The binarization conditions are as follows:

I1(x, y)≧Th1

I2(x, y)≧Th1

Thus, the position of the corneal reflex image is determined from the barycenter of the area extracted from these equations described above.

Figure 6:
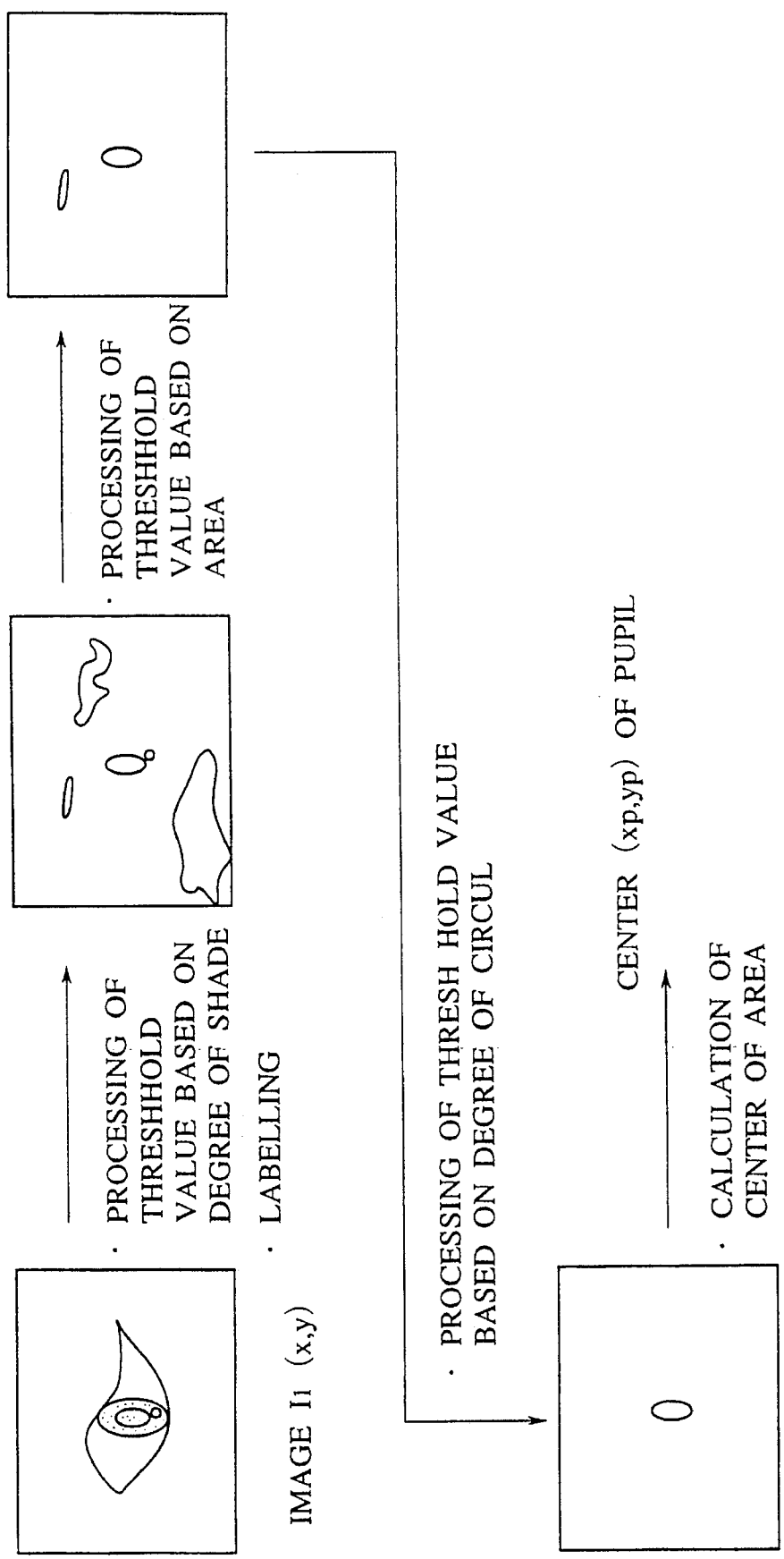
FIG. 6 shows a process of extracting a position of the center of a pupil.

Next, a process of extracting a position of the center of the pupil will be explained with reference to FIG. 6.

A bright retinal reflex image is observed by using the coaxial light source and camera, and the barycenter of the retinal reflex image agrees with the center of the pupil. The retinal reflex image is darker than the corneal reflex image in brightness. Accordingly, a prospective zone of a pupil can be extracted from the binary image which is obtained based on a binarization process by using a threshold value Th2 (Th2<Th1).

Specifically, the pupil prospective zone is determined under the condition of I1(x, y)≧Th2. The result provided in this manner usually includes noises other than a noise of the pupil. These noises must be removed. For this purpose, a plurality of items of prospective image data for the pupil zone are carried out by using labelling process, and then the area of each prospective image data is obtained. Each prospective image data within the range of S−α to S+α is extracted, where S is a prospective pupil area, α is a threshold value, and α>0.

If a prospective image data of one of pupil zones is selected, this pupil zone is determined to be the real pupil. If a plurality of items of prospective image data for the pupil zones are selected, the degree of circularness of each pupil zone is tested in order to determine the real pupil which has the highest circularness.

Figure 7A:
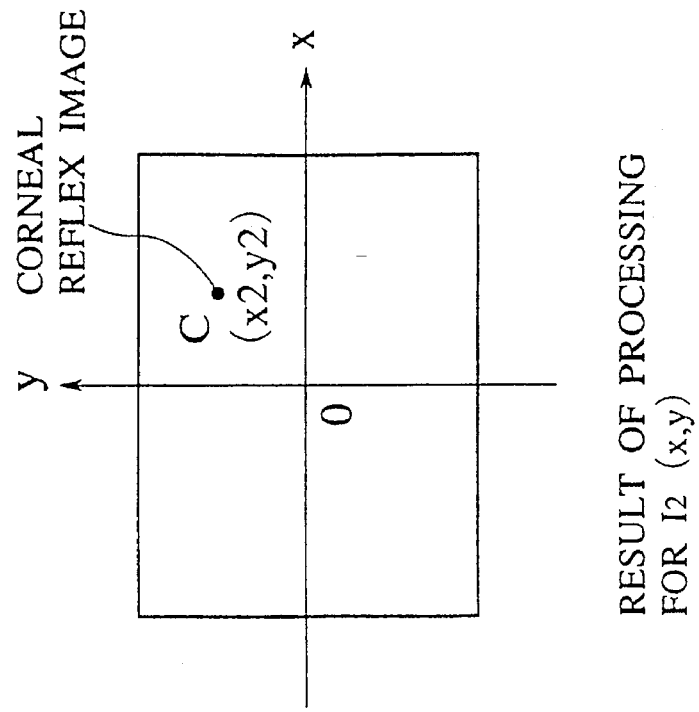
FIGS. 7A to 7B shows a result of image processing operation.
Figure 7B:
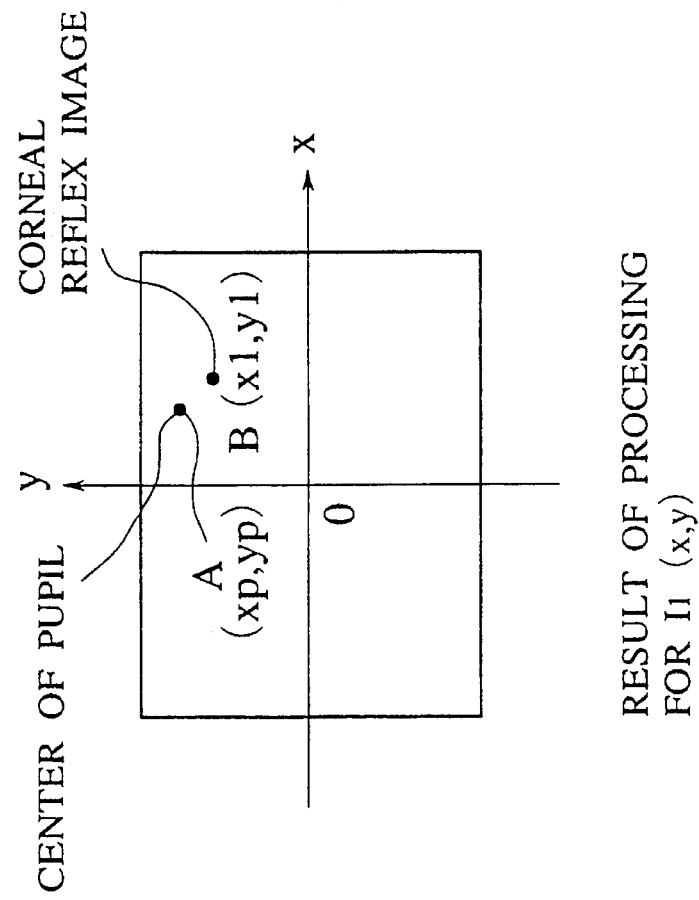

By this manner described above the positions (x1, y1) and (x2, y2) of the corneal reflex images and the position (Xp, Yp) of the center of the real pupil are extracted. FIG. 7 shows the relationship among the positions (x1, y2) and (x2, y2) of the corneal reflex images and the position (xp, yp) of the center of the real pupil.

Figure 4:
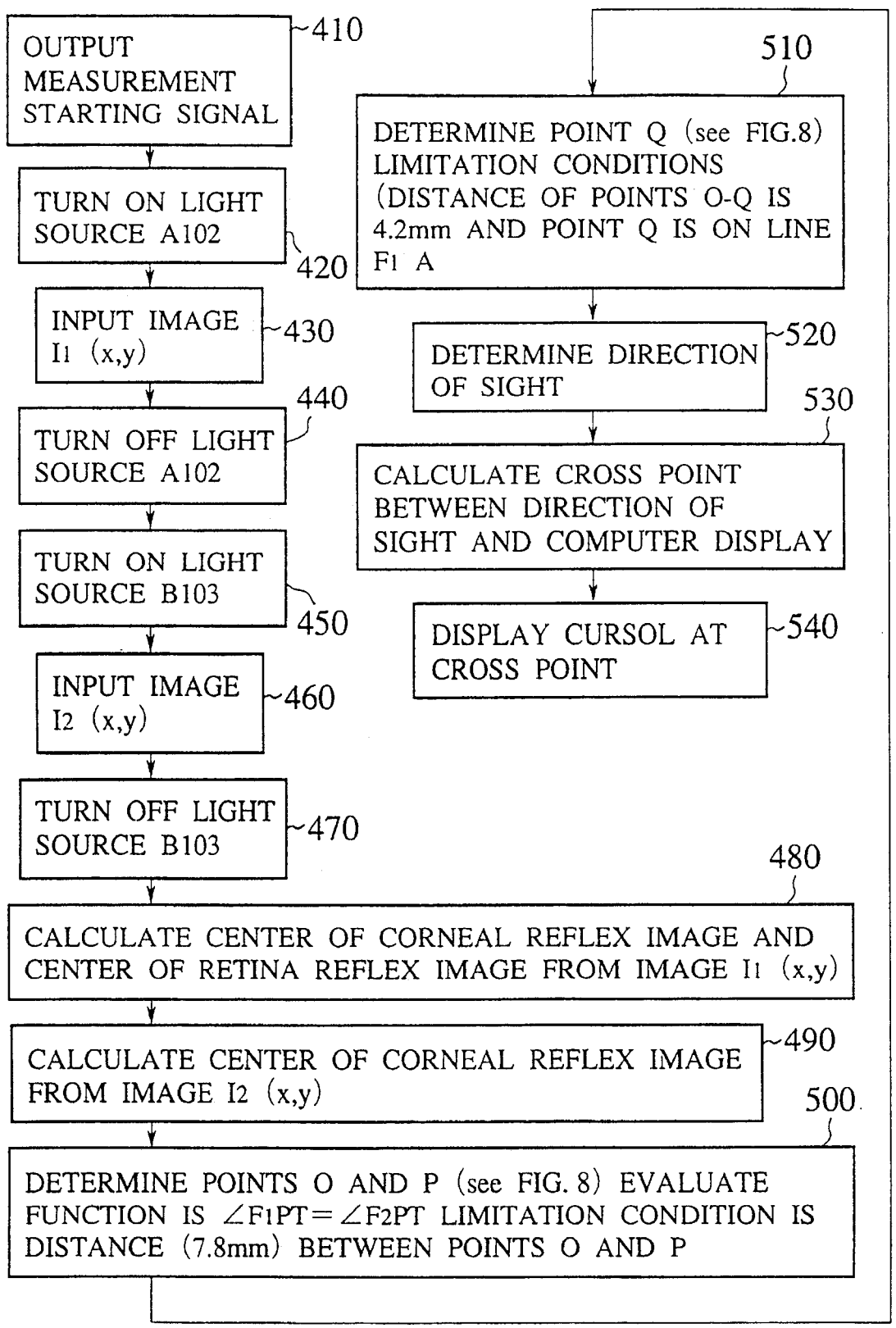
FIG. 4 is a flowchart showing the operation of the apparatus for measuring a sighting direction shown in FIG. 1.
Figure 8:
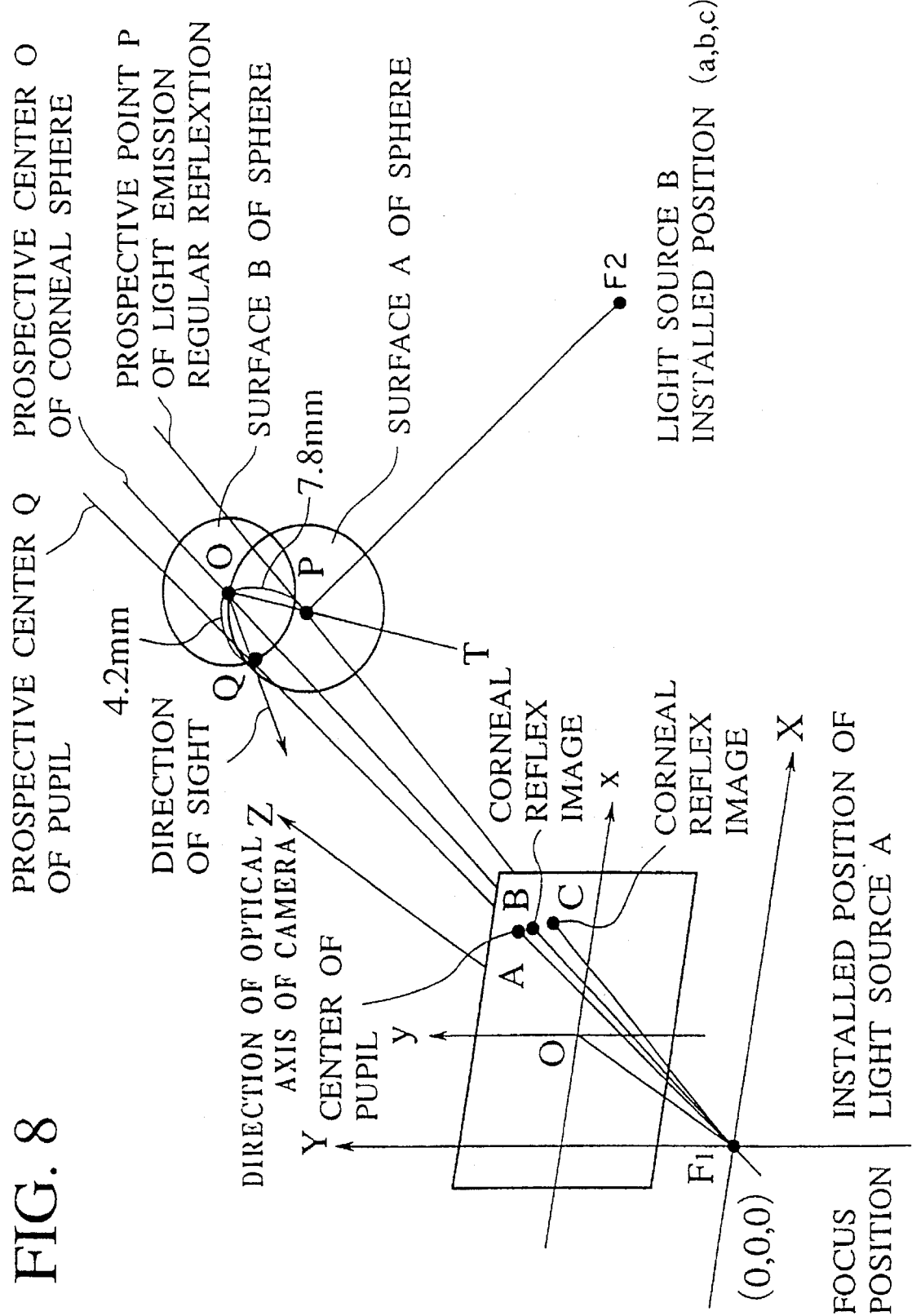
FIG. 8 shows a process of calculating a sighting direction carried out by a sighting direction calculation section in the apparatus for measuring a sighting direction shown in FIG. 1.

Next, the calculation operation of the sighting direction calculation section 106 in the step 520, as shown in FIG. 4, will now be described in detail with reference to FIG. 8.

As prescribed above, when the optical axes of the camera 101 and light source 102 agree with each other, the light emitting position, corneal reflex image, and the center of a corneal sphere are on a straight line, or the straight line between the focus point of the camera 101 and the corneal reflex image on the CCD-plane of the camera 101 passes through the center of the corneal sphere. Specifically, the center of the corneal sphere O is on a straight line F1B. In addition, the center Q of the pupil is on a straight line F1A.

The camera 101 has a focal length f and a focus point F1 (0, 0, 0) serving as an origin. A world coordinate system F1-XYZ is made of an axis X corresponding to an axis x (a horizontal axis) of the CCD plane, an axis Y corresponding to an axis y (a vertical axis) of the CCD plane, and an axis Z corresponding to the optical axis of the camera 101. The second light source 103 is positioned at F2(a, b, c).

Light from the second light source (B) 103 is regularly reflected by the surface of the cornea and is observed by the camera 101. Accordingly, a regular reflex point P is on a straight line F1-C of the point F1 to the point C. The radius of a human corneal sphere is generally about 7.8 mm. Accordingly, the regular reflection point P is temporarily set on the straight line F1-C, to draw a sphere A with a radius of approximately 7.8 mm. An intersection of the sphere A and the straight line F1B uniquely determines a candidate corneal sphere center O. Among two intersections of the sphere A and the straight line F1-B, a distal one from the camera 101 is selected as the candidate center O.

Regular reflex condition at the point P is as follows:

$$\angle F1PT = \angle F2PT$$

where T is a point on an extension of a half line (angle bisector) O-P of the point O to the point P. If these conditions are satisfied at the point P, the point O is determined to be the center of the corneal sphere.

A distance between the center O of the corneal sphere and the center Q of the pupil in front of a crystalline lens is about 4.2 mm. Accordingly, a sphere B having a radius of 4.2 mm is drawn around the point O, and an intersection of the sphere B and the straight line F1-A determines the center Q of the pupil. Then, a sighting vector O-Q is determined. Among two intersections of the sphere B and the straight line F1-A, a proximal one to the camera 101 is selected as the center Q of the pupil. The optical constants of the eye are based on a Gullstrand's eye model.

Returning to FIG. 4, the cursor controller 107 determines, in the step 530, a position on the computer screen 110 corresponding to the calculated sighting direction. In the step 540, the cursor controller 107 positions the cursor at the position determined in the step 530.

Specifically, an intersection of the calculated sighting direction and the computer screen is found, and the cursor is displayed at the intersection.

In this way described above, the apparatus for measuring a sighting direction of eyes according to the present invention achieves cursor movement, window control, and menu selection according to the sighting direction, to thereby realize a noncontact man-machine interface.

In addition, there is another way for extracting the corneal reflex images and the center of a pupil other than the way described above. The another way will now be described below.

First, light sources A and B (corresponding to the light sources 102 and 103) are turned on and off in order to obtain ON and OFF images of an eye.

When the light source A alone is turned on, an image I1on(x, y) is obtained. When the light source B alone is turned on, an image I2on(x, y) is obtained. When the light sources A and B are turned off, an image Ioff(x, y) is obtained. Differences among these images are calculated in order to provide the following differential images I1(x, y) and I2(x, y) containing enhanced corneal and retinal reflection images:

$$I1(x, y) = I1on(x, y) - Ioff(x, y)$$

$$I2(x, y) = I2on(x, y) - Ioff(x, y)$$

The image processing mentioned above is carried out on these images I1(x, y) and I2(x, y), to extract the corneal reflection images and a center of a pupil. Since the images I1(x, y) and I2(x, y) include the enhanced corneal and retinal reflection images, it is easier to extract the characteristics than without the differential images.

Figure 11:
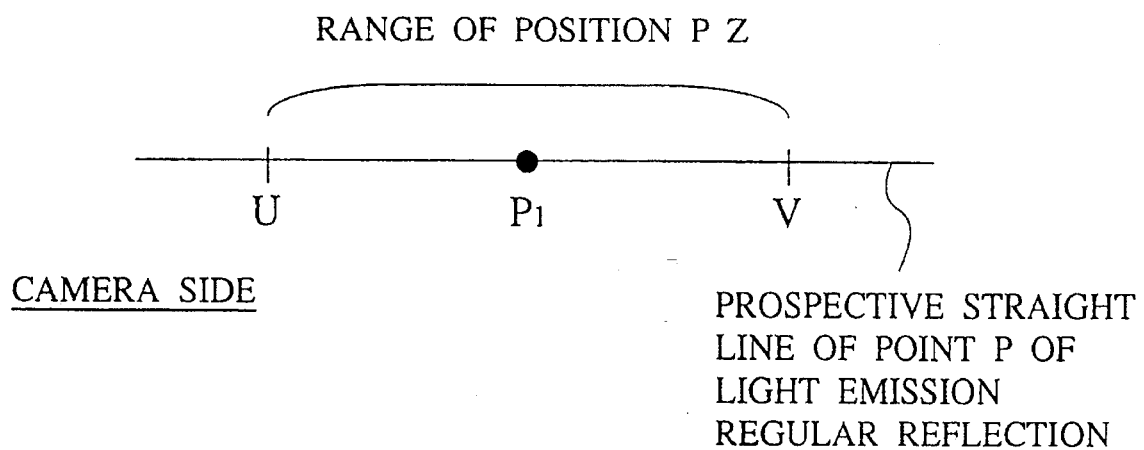
FIG. 11 explains a method of finding a regular reflection point P.

A technique of effectively finding the regular reflex point P of FIG. 8 will be explained with reference to FIG. 11.

A range Z where the point P will exist is estimated according to an illumination area of the light from the light source B (corresponding to the light source 103). A middle point in the range Z is selected as a first candidate point P1 of the point P.

At the first candidate point P1, ∠F1P1T and ∠F2P1T are measured. When ∠F1P1T>∠F2P1T, a middle point between U and P1 is selected as a second candidate point P2, and when ∠F1P1T<∠F2P1T, a middle point between V and P1 is selected as the second candidate point P2.

If ∠F1P1T=∠F2P1T, the point P1 is determined to be the point P. The above process is repeated until the point P is determined. This technique efficiently finds the point P without testing every point in the range Z.

The apparatus for measuring a sighting direction of eyes according to the first embodiment is inexpensive because it employs only one camera.

FIGS. 9A to 9C and 10 show an apparatus for measuring a sighting direction of eyes according to another embodiment of the present invention.

The apparatus of this embodiment serves as an eye switch of an automobile.

Figure 9A:
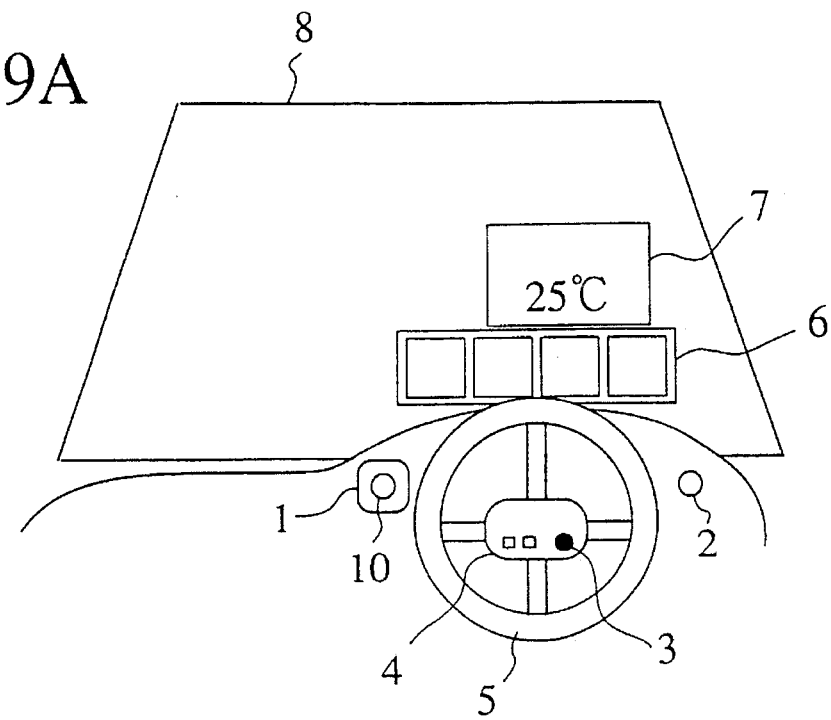
FIGS. 9A to 9C show an apparatus for measuring a sighting direction of eyes according to a second embodiment of the present invention.
Figure 9B:
Figure 9C:
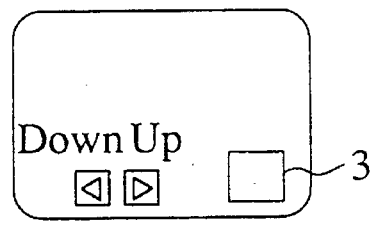
Figure 10:
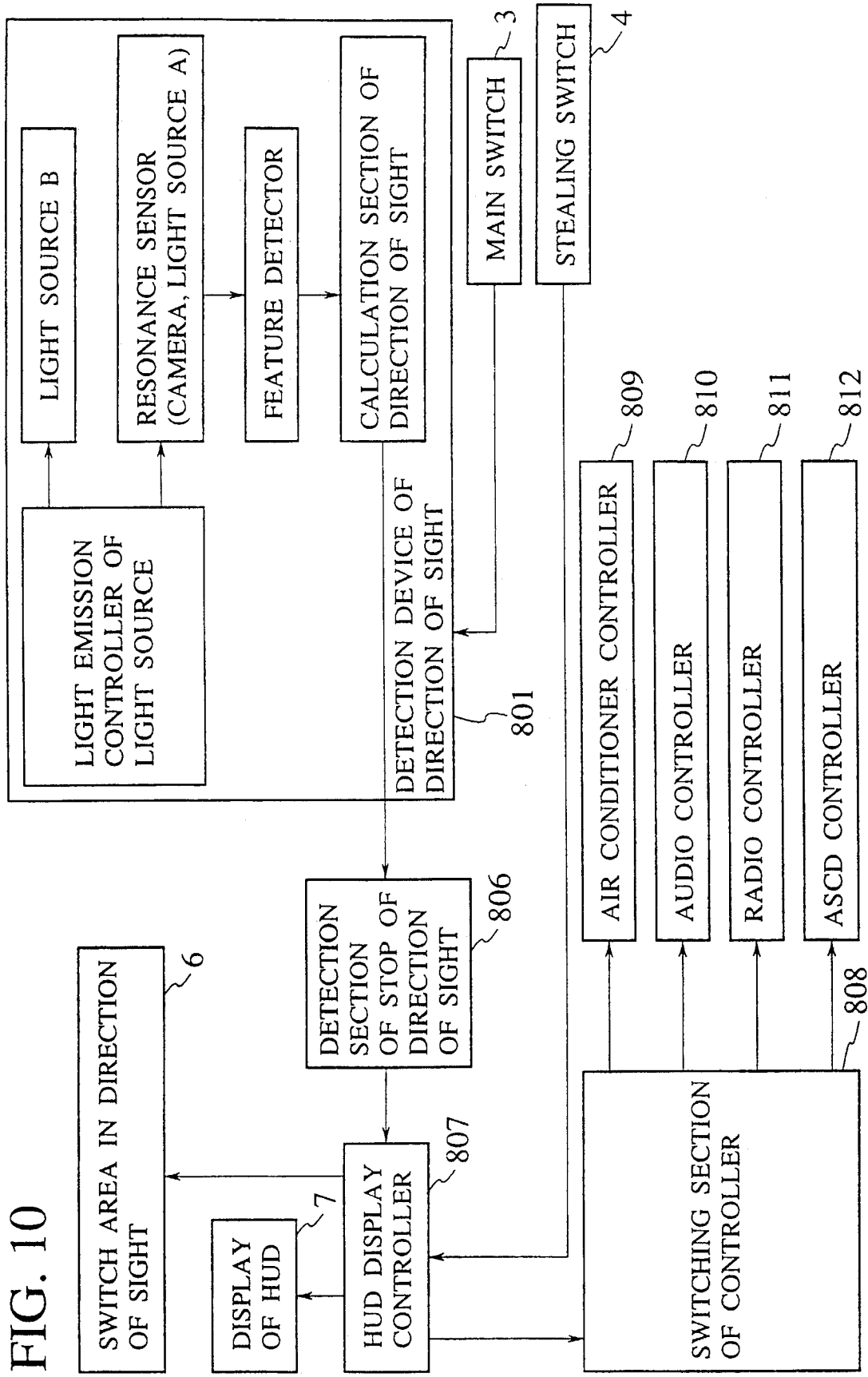
FIG. 10 is a block diagram showing a configuration of the apparatus shown in FIGS. 9A to 9C.

In FIG. 9A, a steering wheel 5 has a main switch 3 and a steering switch 4. A sensor is arranged beside the steering wheel 5. The sensor includes a CCD camera 1 and a near infrared ray emitter 10 that are coaxially arranged with each other. Another near infrared ray emitter 2 is arranged on the right side of the steering wheel 5. A window shield 8 has an eye switch area 6 and an HUD display area 7.

An air conditioner temperature changing operation of the apparatus of FIGS. 9A to 9C and 10 will now be explained.

When a driver intends to control a set temperature of an air conditioner, the driver fixes its eyes on an air conditioner section in the eye switch area 6 on the window shield 8. At the same time, the driver pushes the main switch 3 on the steering wheel 5, to start the apparatus 801, which is identical to the apparatus 100 of FIG. 1. The apparatus 801 measures the sighting direction of the driver according to the processes mentioned above.

The measurement of the sighting direction is repeated several times. When an eye fixation decision section 806 determines that the driver's eyes have been fixed on the air conditioner section in the eye switch area 6 for a predetermined time period (for example, 0.3 seconds), it is determined that the driver is putting its eyes on the air conditioner section, and the present set temperature of the air conditioner is displayed in the HUD display area 7. At the same time, the apparatus 801 is stopped to end the measurement of the sighting direction.

After the set temperature is displayed in the HUD display area 7, up and down buttons (FIG. 9C) of the steering wheel switch 4 function to increase or decrease the set temperature.

The driver operates the up and down buttons while observing the HUD display area 7, to set a required temperature. The set temperature is sent to an air conditioner controller 809 through a controller switch 808, to carry out temperature control. If the steering wheel switch 4 is not operated within a predetermined time period (for example, within five seconds), it is determined that the operation is complete, and an initial state is resumed.

In this way, the apparatus for measuring a sighting direction of eyes according to this embodiment enables a driver to operate switches while looking ahead. This improves the safety of driving. In addition, this embodiment reduces the number of switches on an instrument panel and around a center console, to improve the degree of freedom of designing.

Since the apparatus of this embodiment employs only one camera to measure a sighting direction, it is inexpensive.

In summary, an apparatus for measuring a sighting direction of eyes according to the present invention employs a camera for photographing a human eye, a first light source for emitting invisible light, and a second light source for emitting invisible light. The camera and first light source are coaxial with each other. The first and second light sources are positioned at different locations. Images photographed by the camera are used to find an expression representing a straight line passing through the center of the pupil of the eye, an expression representing a straight line passing through the position of the reflection of the first light source, and an expression representing a straight line passing through the position of the reflection of the second light source.

According to the expressions representing the straight lines passing through the reflections, the position of the center of the corneal sphere of the eye is calculated. According to the positions of the centers of the pupil and corneal sphere, the sighting direction of the eye is calculated. This apparatus employs only one camera to observe an eye and determines a sighting direction of the eye according to images picked up by the camera and processed by a computer. Accordingly, this apparatus is simple and inexpensive.

What is claimed is:

1. An apparatus for measuring a sighting direction of an eye ball of an operator, comprising:

a camera oriented toward the eye ball of the operator for receiving an image transmitted from the eye ball and providing image data therefrom;

a first light source coaxially located with said camera on a coaxial line on which said camera is located, for emitting an invisible light toward the eye ball;

a second light source located apart from said first light source at a position (F2) and also emitting invisible light toward the eye ball;

first arithmetic operation means for solving, according to images of the eye ball received by said camera, a) a first expression representing a first straight line (F1A) passing between a center (Q) of a pupil of the eye ball and a focus point (F1) of said camera;

b) a second expression representing a second straight line (F1B) passing between a position (P') of reflection of light from said first light source and the focus point (F1) of said camera; and c) a third expression representing a third straight line (F1C) passing between a position (P) of reflection of light from said second light source and the focus point (F1) of said camera;

second arithmetic operation means for calculating a position of the center (O) of the corneal sphere of the eye ball according to the second and third expressions representing the second and third straight lines passing through the positions of the reflections of light from said first and second light sources calculated by the first arithmetic operation means; and third arithmetic operation means for calculating a sighting direction of the eye ball according to an expression representing a straight line passing through the center (Q) of the pupil, obtained by the first arithmetic operation means, and the center (O) of the corneal sphere of the eye ball, obtained by said second arithmetic operation means.

2. An apparatus according to claim 1, wherein said first and second light sources emit near infrared rays.

3. An apparatus according to claim 1, wherein said first light source and said camera are located on said coaxial line, and said second light source is on a line other than said coaxial line.

4. An apparatus according to claim 1, further comprising a microcomputer system including said first, second, and third arithmetic operation means.

5. An apparatus according to claim 1, wherein:
said second arithmetic operation means comprises:
means storing a parameter representing a radius of the corneal sphere;
means for calculating the position (P) of reflection of light from said second light source on said third straight line (F1C) according to a position of said focus point (F1) of the camera and the position (F2) of said second light source; and
means for calculating the position of the center (O) of the corneal sphere on the second line (F1B) according to the parameter and the position (P) of reflection of light from said second light source, and
said third arithmetic operation means comprises means for calculating a position of the center (Q) of the pupil on the first line (F1A) defined with the parameter and with the center (O) of the corneal sphere.

6. An apparatus according to claim 1, further comprising computer display means, fourth arithmetic operation means for calculating an intersection between said sighting direction of the eye ball and said computer display means, and display element generating means for generating a display element at said intersection, thereby to provide a contactless interface between a computer activating said computer display means and the operator.

7. An apparatus according to claim 1, wherein said first, second and third arithmetic means operate responsively only to said first and second light sources to calculate said sighting direction of the eye ball.

8. An apparatus according to claim 1, wherein said camera and said first and second light sources are remotely positioned relative to the eye ball of the operator.

* * * * *